F. W. RUGGLES.
POULTRY DRINKING FOUNTAIN.
APPLICATION FILED MAY 13, 1910.
986,945.
Patented Mar. 14, 1911.
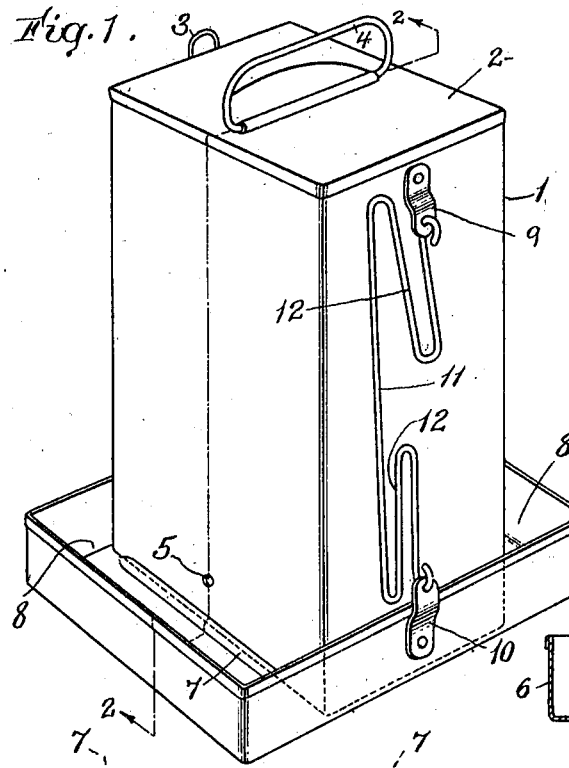
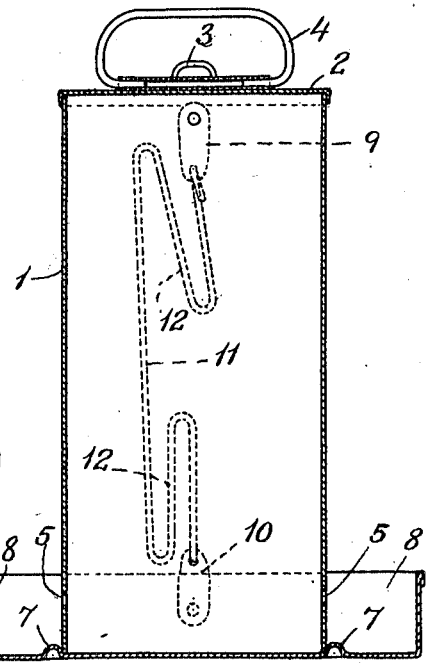
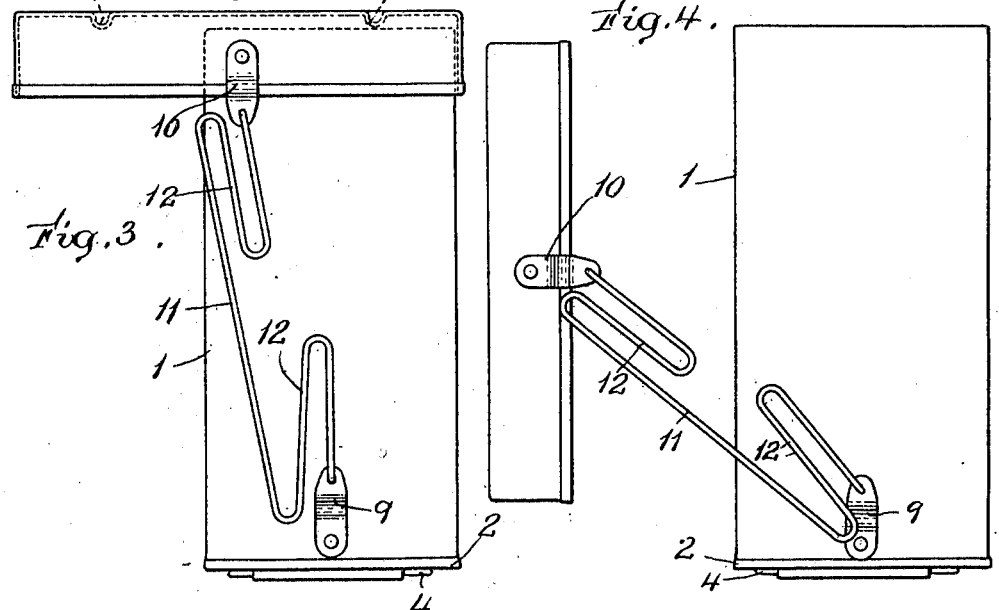
Witnesses:
H. L. Robbins.
H. L. Allen.
Inventor:
Frederick W. Ruggles
by Wright Brown Quinby & May
Attorneys.

UNITED STATES PATENT OFFICE.

FREDERICK W. RUGGLES, OF HUDSON, MASSACHUSETTS.

POULTRY DRINKING-FOUNTAIN.

986,945.  Specification of Letters Patent.  Patented Mar. 14, 1911.

Application filed May 13, 1910. Serial No. 561,226.

*To all whom it may concern:*

Be it known that I, FREDERICK W. RUGGLES, of Hudson, in the county of Middlesex and State of Massachusetts, have invented certain new and useful Improvements in Poultry Drinking-Fountains, of which the following is a specification.

This invention relates to a new and improved drinking fountain for poultry, and consists in the provision of means whereby the pan may be yieldingly maintained in place against the reservoir.

Of the accompanying drawings, forming a part of this specification, Figure 1 is a perspective view of a poultry drinking fountain, constructed in accordance with my invention. Fig. 2 is a vertical sectional view on lines 2—2 of Fig. 1, showing the apertures provided for the escape of the water from the fountain into the pan, showing the instrumentalities provided for positioning the bottom of the reservoir in the bottom of the pan. Fig. 3 is a side elevation of the fountain inverted, showing the pan slid to one side in a position to be tipped or swung off the end of the reservoir. Fig. 4 is a view similar to Fig. 3, showing the pan swung clear from the reservoir, and the latter in position to be filled.

The same reference characters indicate the same parts in all of the figures.

1 represents a reservoir composed of sheet metal, or any suitable material. As shown, said reservoir is rectangular in cross section and provided with a top 2, the opposite end of the reservoir being open.

3 represents an ear secured to one side of the reservoir, by which the whole apparatus may be suspended on a nail or hook.

4 represents a handle secured to the top of the reservoir, by which the fountain may be carried around. The sides of the reservoir near the bottom, are formed with holes 5, there being two of such holes shown, although the precise number is not material. The position of the holes above the bottom of the reservoir is important, since it prevents their being clogged by sediment on the bottom of the pan 6. This pan, as shown, is rectangular in shape, and formed with two ribs or shoulders 7, 7, spaced apart a sufficient distance to permit the open end of the reservoir 1 to rest between them. These ribs also serve to strengthen the bottom of the pan. As shown, these ribs are located to position the reservoir in the middle of the pan, leaving an open space 8, 8, on each side of the reservoir, adapted to receive and hold the water flowing through the holes 5, said open spaces constituting, in effect, independent troughs from which the poultry can drink the water. The bottom of the pan is of greater area than the open end of the reservoir, so that a portion of the pan projects from the reservoir to form a drinking trough, or, as here shown, two troughs external to the reservoir. The reservoir 1 near its top on each side is provided with an ear 9, and the pan in like manner, on each side is provided with an ear 10.

11 represents a wire, there being one on each side of the apparatus. This wire is bent, as shown, between its ends, to form a spring, one end of each wire being connected to an ear 9, and the opposite end to the ear 10.

The construction is such that when the parts are in the position shown in Figs. 1 and 2, the spring is of sufficient strength to maintain the pan against the bottom of the reservoir, when the latter is held by the handle 4, or by the ear 3. When, however, it is desired to remove the pan from the reservoir for the purpose of filling the reservoir, or for any purpose, the yielding of the spring arms 12, 12, is sufficient to permit the pan to be swung off from the end of the reservoir, as shown in Figs. 3 and 4, the wires or rods acting as a spring hinge in this particular. After the reservoir is filled, the pan can be put in proper position on the end of the reservoir by a reverse motion, until the ribs 7 engage either side of the reservoir, when the apparatus can be inverted, the parts 11, in the position shown in Figs. 1 and 2, holding the pan in place against the open end of the reservoir.

It will be seen that the wires 11, formed to constitute springs or resilient links, and flexibly connected both with the reservoir and the pan, are adapted to yieldingly hold the open end of the reservoir against the bottom of the pan, as shown by Figs. 1 and 2, not only for the purpose of maintaining the pan against the bottom of the reservoir, but also to permit the reservoir to separate to a limited extent from the pan, so that in case water in the reservoir freezes, the said wires yield and prevent liability of breakage of the connections between the reservoir and pan. Each wire or link 11, as here shown, is bent to form S shaped or reversely curved end portions and a straight intermediate portion connecting said end portions, said portions being all in the same plane. This form gives the wires sufficient resilience to permit the forcible separation of the pan from the reservoir and at the same time sufficient stiffness to prevent such separation by the weight of the fountain and its contents when it is being carried about or suspended. The sholders 7, on the bottom of the pan constitute means for engaging the reservoir and preventing it from slipping sidewise.

As shown in the drawings, two of the opposite sides of the pan bear against two corresponding sides of the reservoir, while the other two sides of the pan project from the adjacent sides of the reservoir a sufficient distance to form external drinking troughs. The pan is therefore adapted to be moved endwise on the mouth of the reservoir from the position shown by Figs. 1 and 2 to that shown by Fig. 3, so that it may be conveniently tipped or swung off from the reservoir as shown by Fig. 4. The operation of separating the pan from the reservoir is facilitated by the endwise movability of the pan, the pan, when in position shown in Fig. 3 being adapted to be readily displaced by pressing downwardly on its projecting end which acts as a lever.

Having thus explained the nature of my invention and described a way of constructing and using the same, though without attempting to set forth all of the forms in which it may be made, or all of the modes of its use, what I claim and desire to secure by Letters Patent is:—

1. A drinking fountain comprising a reservoir open at one end, an elongated pan, means for yieldingly holding said pan in contact with the open end of said reservoir to form a closure for the latter, the ends of the pan projecting a sufficient distance beyond the plane of the contiguous walls of said reservoir to form drinking troughs, said holding means being constructed to normally prevent movement of said pan in a direction longitudinally of the reservoir, and to permit sliding movement of the pan transversely of the reservoir, said pan being provided with means for normally preventing said transverse movement, the projecting ends of said pan constituting levers, whereby the pan may be displaced against the tension of said holding means.

2. A drinking fountain comprising a reservoir open at one end, an elongated pan, and means for yieldingly holding said pan in contact with the open end of said reservoir to form a closure for the latter, the ends of the pan projecting a sufficient distance beyond the plane of the contiguous walls of said reservoir to form drinking troughs, said holding means being constructed to normally prevent movement of said pan in a direction longitudinally of the reservoir, and to permit sliding movement of the pan transversely of the reservoir, said pan being provided with ribs for engaging said reservoir to normally prevent said transverse movement, the projecting ends of said pan constituting levers, whereby the pan may be displaced against the tension of said holding means.

3. A drinking fountain comprising a pan, a reservoir formed with an open end adapted to be seated on the bottom of the pan, and bent wire links flexibly connected with the reservoir and pan, and each having reversely curved end portions and a straight intermediate portion.

In testimony whereof I have affixed my signature, in presence of two witnesses.

FREDERICK W. RUGGLES.

Witnesses:
H. L. ROBBINS,
P. W. PEZZETTI.

---

Copies of this patent may be obtained for five cents each, by addressing the "Commissioner of Patents, Washington, D. C."